United States Patent [19]

Yoshida

[11] Patent Number: 4,872,003
[45] Date of Patent: Oct. 3, 1989

[54] SERIAL INTERFACE SYSTEM FLEXIBLY APPLICABLE TO A ONE-TO-PLURALITY CONNECTION

[75] Inventor: Ikio Yoshida, Tokyo, Japan

[73] Assignee: NEC Corporation, Japan

[21] Appl. No.: 204,945

[22] Filed: Jun. 1, 1988

Related U.S. Application Data

[63] Continuation of Ser. No. 805,125, Dec. 3, 1985, abandoned.

[30] Foreign Application Priority Data

Nov. 30, 1984 [JP] Japan .................................. 59-251533
Dec. 28, 1984 [JP] Japan .................................. 59-279194

[51] Int. Cl.$^4$ ............................................. H04Q 1/00
[52] U.S. Cl. ............................... 340/825.08; 370/85.8; 370/95.2
[58] Field of Search ..................... 370/85–96, 370/60; 340/310 R, 310 A, 825.06–825.08, 825.5, 825.51, 825.54, 825.53, 825.52; 364/200, 900

[56] References Cited

U.S. PATENT DOCUMENTS

| | | | |
|---|---|---|---|
| 3,633,169 | 1/1972 | Bickford | 370/90 X |
| 3,818,447 | 6/1974 | Craft | 370/95 X |
| 4,051,326 | 9/1977 | Badagnani et al. | 364/900 |
| 4,149,144 | 4/1979 | Diefenderfer | 370/85 X |
| 4,156,866 | 5/1979 | Miller | 340/825.06 |
| 4,173,754 | 11/1979 | Feiker | 340/310 A X |
| 4,225,918 | 9/1980 | Beadle et al. | 364/200 |
| 4,227,178 | 10/1980 | Gergaud et al. | 370/85 X |
| 4,271,505 | 6/1981 | Menot et al. | 370/85 |
| 4,348,722 | 9/1982 | Gunter . | |
| 4,398,289 | 8/1983 | Schoute | 370/94 X |
| 4,410,985 | 10/1983 | Yasumoto et al. | 340/825.08 X |
| 4,518,960 | 5/1985 | Clark | 370/60 X |
| 4,595,921 | 6/1986 | Wang et al. | 340/825.08 |
| 4,683,531 | 7/1987 | Kelch et al. | 340/825.08 X |

Primary Examiner—Ulysses Weldon
Attorney, Agent, or Firm—Ostrolenk, Faber, Gerb & Soffen

[57] ABSTRACT

In a serial interface system wherein a master unit (26, 27) selects one or more of slave units (26, 27) as a destination by an identification number assigned to each slave unit and transmits a data signal to the destination in synchronism with a clock signal, a control path is added to a serial interface. When one of the slave units acts as a source either in transmitting data to the master unit or in transferring data to one or more of other slave units selected as a destination, the source activates the control path to activate, in turn, the master unit. When activated, the master unit sends a clock signal to the interface to make the source transmit or transfer the data in synchronism with the clock signal. Alternatively, the control path is dispensed with. In this event, the master unit is activated either by a command signal produced by the master unit or by a like command signal set forth from a source to the interface in response to an interrogation from the master unit. Preferably, signals except for the clock signal are sent from the master unit or from the source with an identification code included in each frame of the signals to indicate each of the slave units by the identification number that is concerned with the signals.

18 Claims, 7 Drawing Sheets

| I3 I2 I1 I0 | MASTER | SLAVE |
|---|---|---|
| 0 0 0 0 | TRANSMISSION OR TRANSFER REQUEST? | YES |
| 0 0 0 1 | ALLOWANCE OF DATA TRANSMISSION OR TRANSFER | START OF DATA TRANSMISSION OR TRANSFER |
| 0 0 1 0 | FORCED SUSPENSION OF DATA TRANSMISSION & TRANSFER | END OF DATA TRANSMISSION OR TRANSFER |
| 0 0 1 1 | REQUEST FOR RETRANSMISSION | — |
| 0 1 0 0 | REQUEST FOR TRANSMISSION OF PARITY DATA | — |
| 0 1 0 1 | — | — |
| 0 1 1 0 | INITIALIZE SLAVES | — |
| 0 1 1 1 | READY FOR RECEPTION OR BUSY? | READY FOR RECEPTION |
| 1 0 0 0 | WHICH DEVICE IS USED? | — |
| 1 0 0 1 | START OF DATA TRANSMISSION | READY FOR RECEPTION OF DATA TRANSMISSION |
| 1 0 1 0 | END OF DATA TRANSMISSION FROM THE MASTER | — |
| 1 0 1 1 | — | — |
| ⋮ | | |
| 1 1 1 0 | — | — |
| 1 1 1 1 | NO SIGNAL IS SENT | NO SIGNAL IS SENT |

FIG. 13.

SERIAL INTERFACE SYSTEM FLEXIBLY APPLICABLE TO A ONE-TO-PLURALITY CONNECTION

This is a continuation of application Ser. No. 805,125, filed on Dec. 3, 1985 now abandoned.

BACKGROUND OF THE INVENTION

This invention relates to a serial interface system which comprises a master unit, a plurality of slave units, and a serial interface shared by the master and the slave units.

A serial interface system is described in U.S. Pat. No. 4,348,722 issued to Thomas G. Gunter et al and assigned to Motorola, Inc. Such a serial interface system may be used in portable terminal equipment on board a mobile vehicle, for example in a mobile communication network.

A conventional serial interface system may comprise a standard interface, such as one known in the trade by the code RC-232C. The RC-232C is an asynchronous interface. Another conventional serial interface system comprises a synchronous interface, such as used in a 72-chip central processing unit. The latter interface is operable at a high speed and has merits in hardware as well as in software when used in a one-to-one connection. The conventional serial interface must, however, comprise a chip select (CS) line for each unit when applied to a one-to-multiplicity connection. This makes it difficult to use the serial interface system to interconnect a master unit and five or more slave units. Moreover, sure serial interface system cannot flexibly accommodate a change in the connection or an increase in the number of slave units.

SUMMARY OF THE INVENTION

It is therefore an object of the present invention to provide a serial interface system which is operable at a high speed and is applicable to a one-to-plurality connection.

It is another object of this invention to provide a serial interface system of the foregoing type, which can flexibly change its interconnect routes.

Briefly stated, the serial interface system of the invention comprises a master unit, a plurality of slave units, and a serial interface for communication between the master unit and at least two of the slave units. According to this invention, the master unit includes energizing means connected to the interface for energizing the interface. Furthermore, the system includes activating means for controllably activating the energizing means when one of the master and the slave units begins communication.

According to one form of the invention, the activating means comprises a control path which is shared by the master and the slave units and is always and selectively activated when the master and one of the slave units begin communication, respectively. The control path activates, in turn, the energizing means when activated.

According to another form of the invention, the master unit includes first means for making the energizing means energize the interface with a first signal. In cooperation, the inventive system includes second means coupled to each slave unit for supplying the interface with a second signal. Either the first or the second signal is for activating the energizing means. The first and the second means thereby collectively serve as the activating means.

BRIEF DESCRIPTION OF THE DRAWING

The above objects as well as other objects of this invention shall become readily apparent after reading the following description of the accompanying drawings in which.

DESCRIPTION OF THE PREFERRED EMBODIMENTS

Figure 1:
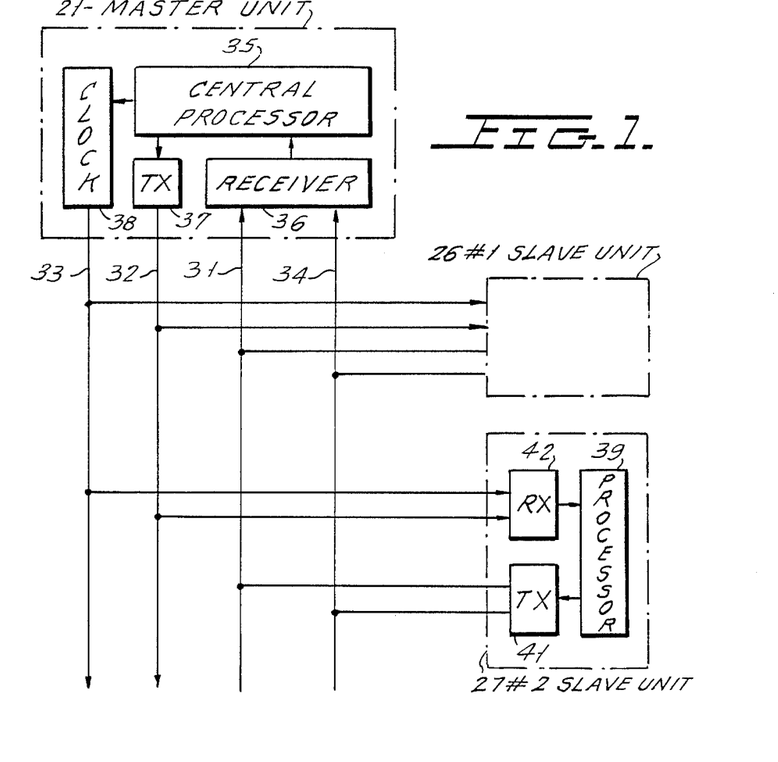
FIG. 1 is a block diagram of a serial interface system according to a first embodiment of the instant invention.

FIG. 1 describes a serial interface system according to a first embodiment of the present invention. The system comprises a master unit 21, first and second slave units 26 and 27, and other slave units (not shown). Each of the master and the slave units may include a microprocessor. Each slave unit may be one of a variety of types, such as a telephone handset, a facsimile device, a computer, a radio transmitter/receiver or modem, an item of test equipment, and an adapter for such devices. It should be noted that each of such devices should comprise a processor. At any rate, it will be assumed that the first, the second, and the other slave units 26, 27, and so forth are preliminarily assigned with respective identification numbers in a predetermined order, which may be an ascending order.

The serial interface system comprises a serial interface consisting of first and second paths or routes 31 and 32, a clock path 33, and a control path 34. Each path may be conductive wiring or a radio channel. In a manner which will presently be understood, the first and second paths 31 and 32 are for primarily transmitting data signals between the master unit 21 and one or more slave units. The clock path 33 is for transmitting a clock signal from the master unit 21 to each slave unit for the data signals transmitted through the first and second paths 31 and 32. Only the first path 31, the second path 32 and the clock path 33 are referred to collectively as a serial interface or I/O path depending on the circumstances. The control path 34 will later become clear.

The master unit 21 includes a central processor 35. In the master unit 21, a master receiver 36 and a transmitter 37 are coupled to the central processor 35 in a manner which will become clear as the description proceeds. A clock generator 38 is controlled by the central processor 35. The master receiver and transmitter 36 and 37, respectively and the clock generator 38 are connected to the first, the second, and the clock paths 31 through 33, respectively. In the manner depicted in the second slave unit 27, each slave unit comprises a slave processor 39 and a slave transmitter and a receiver 41 and 42, respectively, which are coupled to the slave processor 39. The slave transmitter 41 is connected to the first path 31. The slave receiver 42 is connected to the second and the clock paths 32 and 33, respectively. The first path 31 therefore primarily serves as an input data path for the master unit 21 and as an output data path for each slave unit. The second path 32 primarily serves as an output data path for the master unit 21 and as an input data path for each slave unit.

Figure 2:
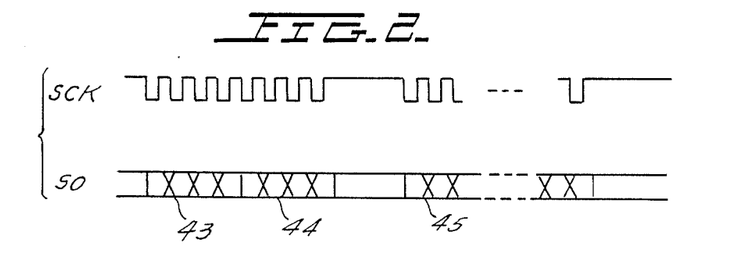
FIG. 2 is a timing chart for use in describing operation of the serial interface system depicted in FIG. 1.
Figure 3:
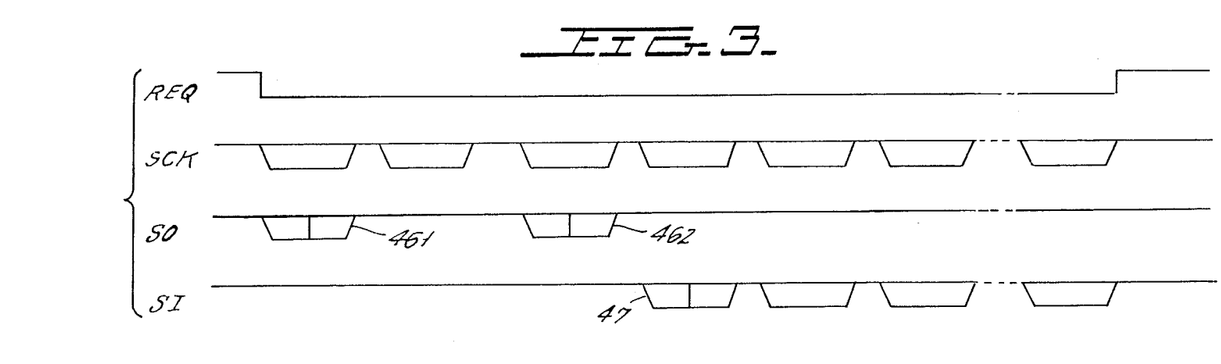
FIG. 3 is a timing chart for use in describing another operation of the serial interface system shown in FIG. 1.
Figure 4:
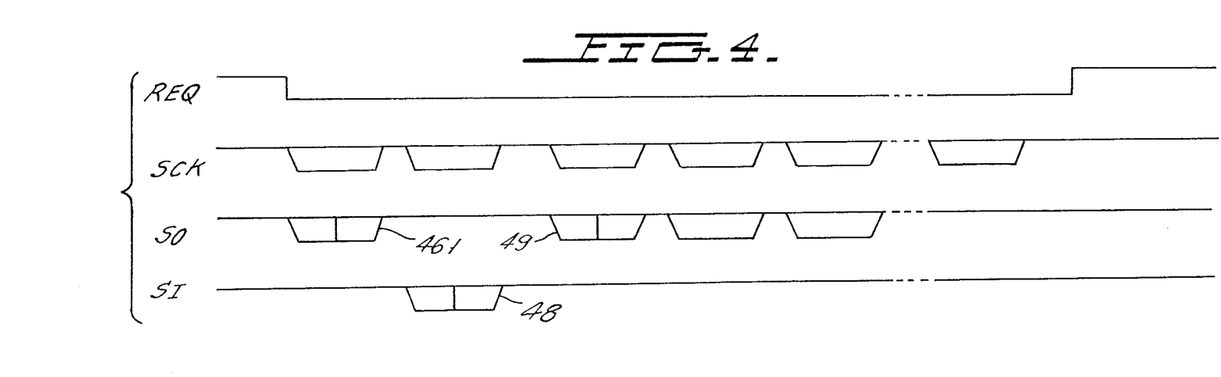
FIG. 4 is a timing chart for use in describing still another operation of the serial interface system illustrated in FIG. 1.

Turning to FIGS. 2 through 4, operation of the serial interface system will be described with assumptions such that sixteen or fewer slave units 26, 27, and so on are connected to the serial interface and that sixteen or less bytes are transmitted as the data signal between a pair of units of the master and the slave units 21, 26, 27, respectively and others. Each frame of the data signal consists of eight bits FIG. 2 shows only two frames. The clock generator 38 (FIG. 1) generates eight clock pulses of the clock signal in each frame in the manner indicated at SCK (synchronization clocks) shown in detail for a first frame at the lefthand side of FIG. 2.

Referring more particularly to FIG. 2, it will be assumed that the communication through the serial interface 31-33 is transmission of data signal of a certain duration from the master unit 21 to either the first slave unit 26 or the second slave unit 27. Controlled by the central processor 35, the clock generator 38 sends the clock signal SCK to the clock path 33 from the beginning of the first frame. It may be mentioned here that the master transmitter 37 transmits information as information samples whenever the clock signal SCK builds down. The master transmitter 37 thereby sends eight information samples to the slave units 26, 27, and others in each frame through the second path 32 as a serial data output SO of the data signal.

In the first frame, four preceding bits 43 of the information samples are used as an identification code representative of the identification number of the slave unit of a destination to which the data signal should be transmitted. Four succeeding bits 44 are used to indicate the number of bytes, or a byte number, representative of the duration of the data signal. As in the first frame, the clock generator 38 generates the clock pulses during following frames of a number which is indicated by the four succeeding bits 44. Alternatively, the clock generator 38 is controlled by the central processor 35 so as to generate the clock pulses for each of such following frames until the number of the following frames reaches the number indicated. In each of the following frames, eights bits 45 of the information samples are representative of the data signal transmitted to the destination. When it is necessary to send the same data signal to all slave units, the four preceding bits 43 should be given a specific code. In this event, the number of slave units should be fifteen or less.

All the while, the slave units 26, 27, and so forth are capable of receiving signals from the serial interface 31-33. More specifically, the slave receiver 42 receives the clock signal SCK in each slave unit during the first frame. Responsive to the four preceding bits 43, the slave processor 39 decides whether or not its slave unit is the destination. Only the slave receiver 42 of the destination thereafter receives the data signal, such as 45, whenever the clock signal SCK builds up.

Turning to FIG. 3, it will be assumed that the communication is transmission of a data signal from the second slave unit 27 to the master unit 21. Such a slave unit which begins communication as a source or origin, may be called a particular slave unit. At first, the slave transmitter 41 activates the control path 34 under the control of the slave processor 39. The activation is herein called an activate request REQ and is indicated by a transition from a high level to a low level. The master receiver 36 receives the activate request REQ through the control path 34. Responsive to the activation request REQ, the central processor 35 carries out polling successively to the slave units 26, 27, and so on in a predetermined order, such as in the ascending order, until the source is located. With the clock signal SCK sent to the clock path 33, the master transmitter 37 is made to carry out the polling in a polling cycle consisting of first and second frames. It is possible to make the central processor 35 carry out the polling with other operations interrupted.

In order to carry out the polling, the master transmitter 37 sends a polling signal 461 to the second path 32 as the serial data output SO during the first frame of a first polling cycle. The polling signal 461 comprises an identification code indicative of the identification number which stands foremost in the ascending order for the first slave unit 26. During the second frame of the first polling cycle, the master receiver 36 receives no answer from any one of the slave units 26, 27, and others in the manner depicted along a line representative of a serial data input SI to the master unit 21.

In the first frame of a second polling cycle, the master transmitter 37 sends another polling signal 462 to the second path 32. The polling signal 462 indicates the identification number of the second slave unit 27. The slave receiver 42 receives the serial data output SO. Responsive to the identification number indicated by the serial data output SO, the slave processor 39 knows that the second slave unit 27 is polled. The slave processor 39 of the second slave unit 27 makes the slave transmitter 41 send a transmission request signal 47 as an answer signal to the first path 31. The transmission request signal 47 represents the identification number of the second slave unit 27 and the number of bytes of the data signal which should be transmitted to the master unit 21.

Responsive to the transmission request signal 47 received by the master receiver 36, the central processor 35 makes the clock generator 38 generate the clock pulses of a number which corresponds to the number of bytes in the manner depicted along a line labelled SCK. In synchronism with the clock pulses received by the slave receiver 42, the slave transmitter 41 sends the data signal to the master unit 21. Upon completion of transmission of the data signal, the slave processor 39 makes the slave transmitter 41 render the control path 34 inactive to inform the master unit 21 of the completion.

Further turning to FIG. 4, it will be assumed that the communication is transfer of a data signal from the first slave unit 26 to the second slave unit 27. The first and the second slave units 26 and 27 are a source or origin and a destination respective of the data signal to be transferred. In the manner described in conjunction with FIG. 3 and depicted along a line labelled REQ in FIG. 4, the first slave unit 26 activates the control path 34. In the first frame of the first polling cycle, the master unit 21 sends the polling signal 461 as the serial data output SO (FIG. 4). The first slave unit 26 sends a transfer request signal 48 in the second frame of the first polling cycle as the serial data input SI for the master unit 21. The transfer request signal 48 may again represent the identification number of the source 26 and represents the identification number of the destination 27. In a manner which will shortly become clear, the transfer request signal 48 is a part of an answer signal. In response to the transfer request signal 48, the master unit 21 sends the clock signal SCK to the slave units 26, 27, and others in a first frame which next follows the polling cycle.

Figure 5:
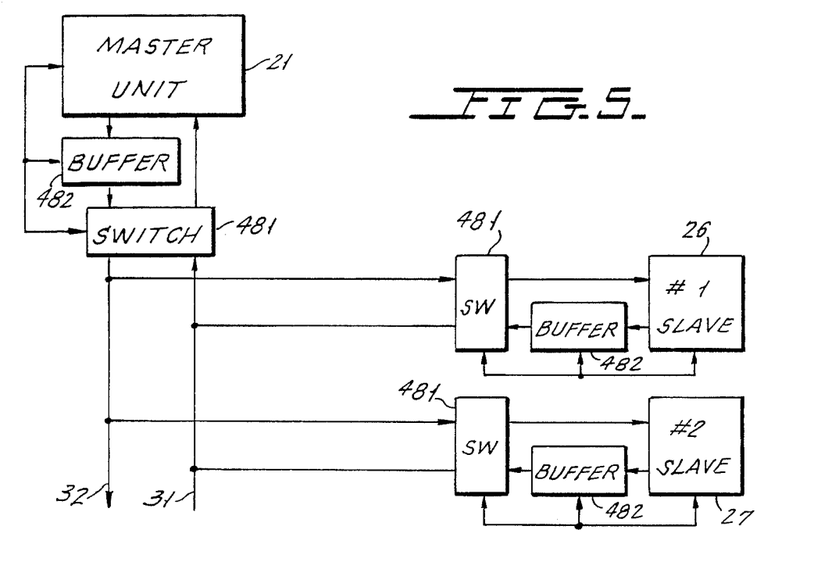
FIG. 5 is a partial block diagram of the serial interface system illustrated in FIG. 1.

Turning briefly to FIG. 5, the serial interface 31-33 comprises a switch 481 interposed between the master unit 21 and each of the slave units 26, 27, and so on. The switch 481 is controlled by a pertinent one of the central processor 35 and the slave processors, such as 39. A three-state buffer 482 is used in the second path 32 between the switch 481 and the master unit 21 and in the first path 31 between the switch 481 and each slave unit. The buffer 482 is for avoiding collision of signals in a known manner. The buffer 482 is controlled by a relevant one of the central processor 35 and the slave processors.

Turning back to FIG. 4, the central processor 35 responds to the transfer request signal 48 to switch the first and the second paths 31 and 32 from a usual state to a temporary state by activating the switches 481 in cooperation with the source slave 26. As a result of the switching, the first path 31 is connected in the temporary state to the master transmitter 37 and to the slave receiver of the source 26. Even in the temporary state, the first path 31 is connected to the slave transmitters, such as 41, (FIG. 1) of other slave units 27 and so forth, as in the usual state. The second path 32 is connected to the master receiver 36 (FIG. 1) and to the slave transmitter 44 of the source 26. As in the usual state, the second path 32 is connected to the slave receivers, such as 42, of the other slave units.

During a first frame which next follows the switching, the master unit 21 sends the clock signal SCK to the clock path 33. The source 26 sends a transfer request signal 49 to the second path 32 as a remaining part of the answer signal. Except for transmission through the second path 32, the transfer request signal 49 is similar to the transmission request signal 47 of FIG. 3 and indicates the identification number of the destination 27 and the number of bytes of the data signal to be transferred from the source 26 to the destination 27. During the frames which follow the first frame, the data signal is transferred from the source 26 to the destination 27 in the manner described above with reference to FIG. 3. When the control path 34 is rendered inactive upon completion of the transfer, the master unit 21 switches the first and the second paths 31 and 32 from the temporary state back to the usual state. The transfer comes to an end.

Reviewing FIGS. 1 through 4, a combination of the central processor 35 and the master receiver and transmitter 36 and 37, respectively serves as an energizing arrangement connected to the serial interface 31-33 for energizing the interface 31-33 by sending the polling signal, the data signal, and the like to the interface 31-33. A combination of the master processor 35, the master receiver 36, the control path 34, the slave processor 39 and the slave transmitter 41 serves as an activating arrangement for controllably activating the energizing arrangement when one of the slave units 26, 27, and others begins communication through the interface 31-33. The central processor 35 and the master receiver 36 are shared by the energizing and the activating arrangement. It is possible to understand that the activating arrangement is always activated when the master unit 21 begins communication. The activating arrangement is selectively activated when one of the slave units 26, 27, and so forth begins communication. Activated in this manner, the activating arrangement activates, in turn, the energizing arrangement 35-37.

In addition, it is understood that the master unit 21 is connected to a plurality of slave units, such as 26 and 27, through the serial interface 31-33. Transmission of a data signal is possible from the master unit 21 to one or more of the slave units. The serial interface system is therefore applicable to a one-to-plurality or one-to-multiplicity connection. Together with the master unit 21, a plurality of slave units are connected together through the interface 31-33. Transfer of a data signal is possible from any one of the slave units to one or more of other slave units. The serial interface system is therefore applicable also to a plurality-to-plurality connection. Moreover, the serial interface system is flexible. More particularly, the system may be changed by merely adapting the central processor 35 to the change, even in the severest case. The slave units can be increased or decreased in number provided that the afore-mentioned identification code is capable of differentiating the slave units when the slave units are increased. The serial interface system is operable at a high speed as described above. It may be mentioned here that the activating arrangement makes it possible to use the serial interface system 31-33 as a bus.

Figure 6:
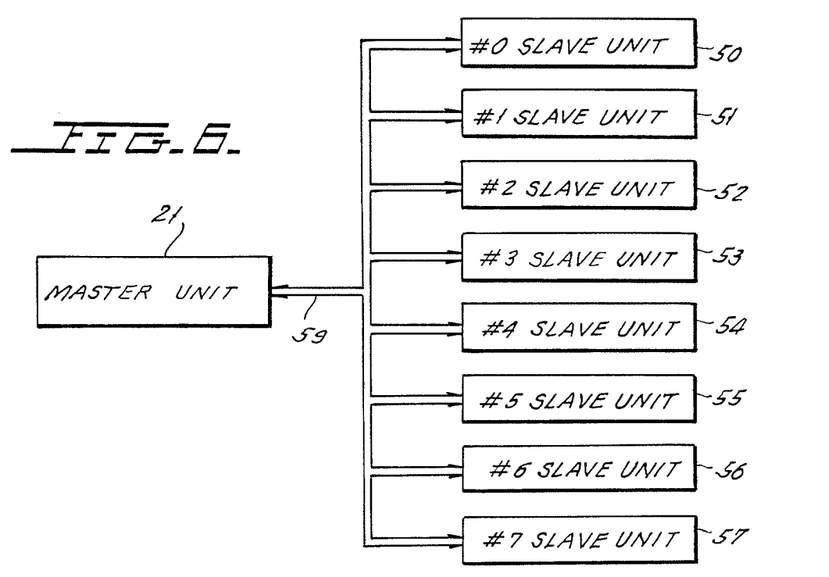
FIG. 6 is a block diagram of a serial interface system according to a second embodiment of this invention.

Referring now to FIG. 6, description will proceed to a serial interface system according to the second embodiment of this invention. The serial interface system comprises a master unit, eight or fewer slave units, and a serial interface system. The master unit is equivalent to that described in conjunction with FIG. 1 and will therefore be designated by the reference numeral 21. In the example being illustrated, the slave units are zeroth through seventh slave units 50, 51, 52, 53, 54, 55, 56, and 57, respectively. The serial interface, depicted at 59, may be comprised of the serial interface of FIG. 1, and need not include the control path 34 (FIG. 1).

Figure 7:
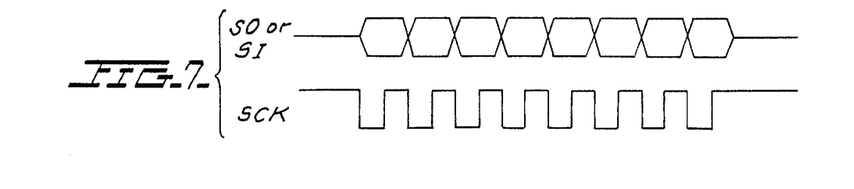
FIG. 7 is a time chart of signals used in the serial interface system depicted in FIG. 6.

Turning to FIG. 7, serial data output and input SO and SI and a clock signal SCK are transmitted through the serial interface 59 in the manner which is described above and will again be described below. It will be assumed that each frame consists of eight bits. As described, the serial data output SO is sent either from the master unit 21 or from one of the slave units 50 through 57 when the clock signal SCK builds down. The serial data input SI is received either at the master unit 21 or at one or more of the slave units 50 to 57 when the clock signal SCK builds up.

Figure 8:
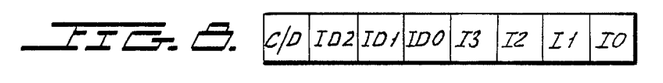
FIG. 8 shows a format of the signal used in the serial interface system depicted in FIG. 6.

Referring to FIG. 8, each frame of the serial data output SO is a succession of a C/D bit, three identification bits ID2, ID1, and ID0, and four information bits I3, I2, I1, and I0. The serial data input SI has a format which is not different from that of the serial data output SO because the serial data output SO is received as the serial data input SI through the interface 59. The C/D bit is used in indicating whether the frame is used as a command signal or a frame of a data signal, namely, whether the information bits I (suffixes omitted) represent a command or a datum. The identification bits ID (suffixes omitted) give an identification code representative of an identification number assigned to each slave unit in the manner already described.

Figure 9:
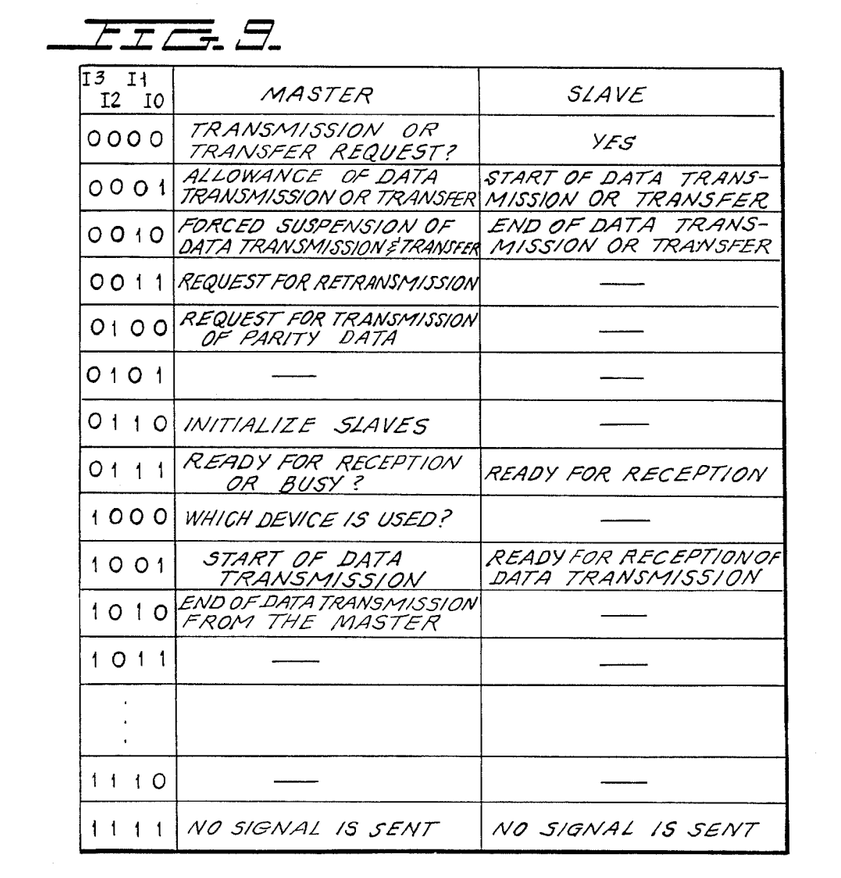
FIG. 9 shows various command codes used in the serial interface system illustrated in FIG. 6.

Turning to FIG. 9, the information bits I are capable of representing up to sixteen commands when C/D bit indicates a command signal. In other words, the information bits I can be used as one of up to sixteen command codes. Each command code is used generally both in the master unit 21 (FIG. 6) and in each slave unit. By way of example, such command codes are used in the manner which is briefly shown in FIG. 9 and will be described in the following. The command codes will be called by names used hereunder.

(0) Zeroth command code 0000:

Transmission from the master unit indicates an interrogation to the slave units as regards presence and absence of a transmission or transfer request in one of the slave units. The master unit can send the zeroth command code in a frame with the zeroth command code preceded in the frame by an identification code for a selected one of the slave units.

The selected one of the slave units sends the zeroth command code as a reply to the zeroth command code directed thereto from the master unit. This informs the master unit of the fact that the selected one of the slave units has a data signal which should be either transmitted to the master unit or transferred to one or more of other slave units. The selected one of the slave units may send the zeroth command code with the identification code representative of the identification number assigned thereto. This enables the master unit confirm the reply. When the slave units have neither a transmission request nor a transfer request, the slave units are quiescent and send nothing to the interface in response to the interrogation.

(1) First command code 0001:

Transmission from the master unit indicates allowance for the data transmission or transfer. The selected one of the slave units sends the first command code in reply in order to indicate start of the data transmission or transfer.

(2) Second command code 0010:

Transmission from the master unit indicates forced suspension of the data transmission and transfer during reception of the data signal and during the data transfer. Transmission from a slave unit indicates an end of the data transmission or transfer. The selected one of the slave unit sends the first command code also in response to the forced suspension.

(3) Third command code 0011:

Transmission from the master unit indicates a request for retransmission of the data signal during reception of the data signal from the selected one of the slave units.

(4) Fourth command code 0100:

Transmission from the master unit indicates a request to the selected one of the slave units for transmission of parity data which may be calculated in the slave unit having received the request in accordance with the data signal which are already received by the selected one of the slave units before reception of the request.

(5) Fifth command code 0101:

In the example being illustrated, the fifth command code is not used. Such facts are represented in the figure by dashes.

(6) Sixth command code 0110:

This command is used by the master unit during a series of initializing processes, such as switch on of a power source (not shown). In response, the slave units are initialialized. For example, flages are initialized which should be produced by the slave processors, such as 39 (FIG. 1).

(7) Seventh command code 0111:

On transmitting a data signal either to a selected one or to all of the slave units, the master unit sends the seventh command code to the serial interface in order to interrogate whether the slave unit or units are busy or ready for reception of the data signal. Interrogated by an accompanying identification code, the slave unit sends the seventh command code to the serial interface when it is ready for the reception. The slave unit is quiescent when it is busy.

(8) Eighth command code 1000:

Having initialized the slave units, the master unit may send the eighth command code to one of the slave units that is selected as a questioned slave unit. This is to interrogate which of a plurality of devices, such as a telephone handset exemplified heretobefore, is for use in the questioned slave unit. In reply, the questioned slave unit may send a data code given by the four information bits I. In this event, the data code can represent one of sixteen or less types of the device.

(9) Ninth command code 1001:

Transmission from the master unit indicates start of data transmission either to a selected one or to all of the slave units. When reception of the data signal is possible in the slave unit identified by an accompanying identification code, the slave unit sends the ninth command code to the serial interface. When the reception is impossible, the slave unit is quiescent. The reception is impossible when the slave unit in question is busy.

(10) Tenth command code 1010:

Transmission from the master unit indicates an end of the data transmission to the selected one or to all of the slave units.

(11) Eleventh to fifteenth command codes:

In the illustrated example, only the fifteenth command code 1111 is used in indicating that no signal is sent to the serial interface either from the master unit or from any one of the slave units.

Figures 10, 11:
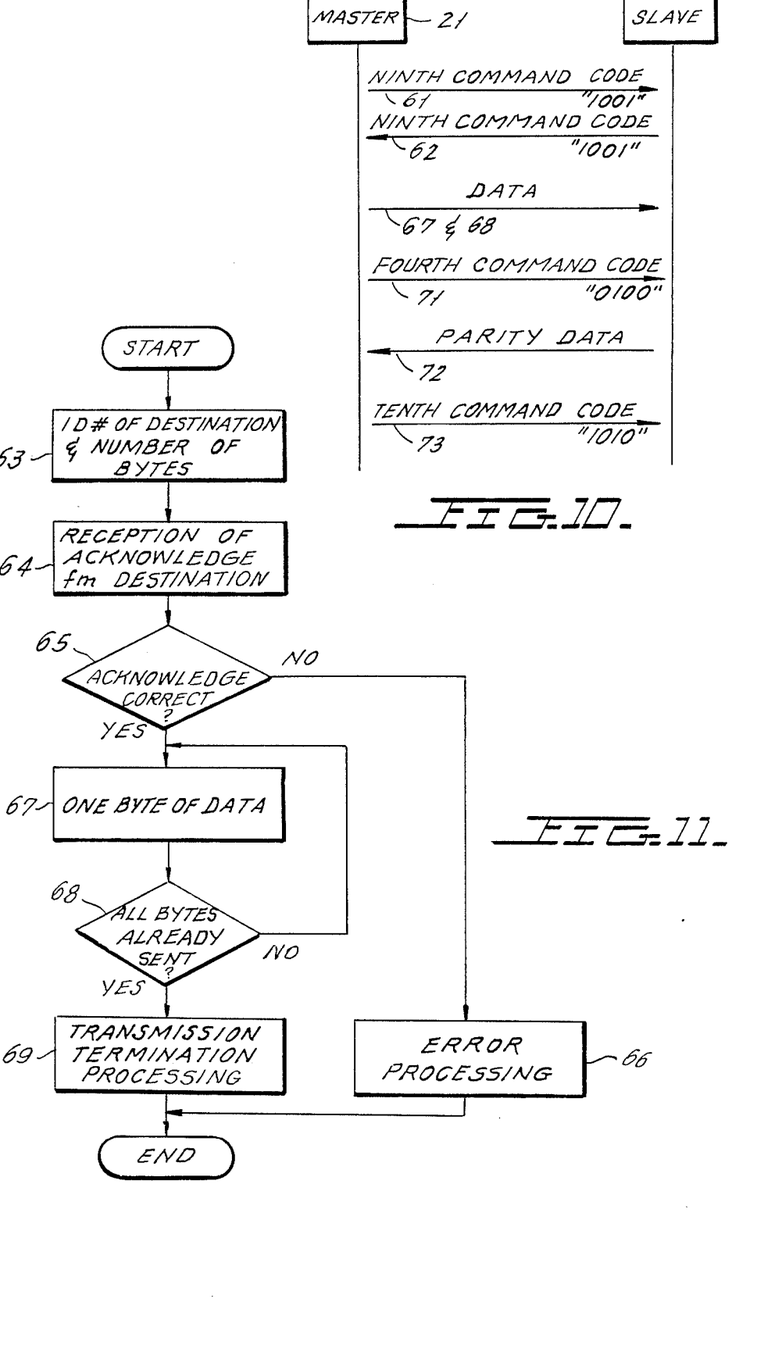
FIG. 10 is a sequence diagram illustrative of operation of the serial interface system shown in FIG. 6.
FIG. 11 is a flow chart for use in describing the operation mentioned in conjunction with FIG. 10.

Referring to FIGS. 10 and 11, transmission of a data signal will be described for a case where the master unit 21 (FIG. 6) transmits the data signal to one of the slave units 50 through 57 that is selected as a destination. It will be presumed that various commands are indicated by the command codes as above. Some of the command codes will not be described in the following although they are used in practice.

The master unit 21 sends the ninth command code to the serial interface 59 at a step 61. It will be surmised merely for simplicity of description that all slave units 50 to 57 are capable of receiving the ninth command code. Having received the ninth command code through the serial interface 59, all slave units send the ninth command code to the serial interface 59 at a step 62 which next follows the step 61. The master unit 21 thereby knows that all slave units are ready for reception. The master unit 21 sends an addressing signal to the serial interface 59 at another step 63. In the addressing signal, the identification code represents an identification number of the destination. The information bits I represent the number of bytes of the data signal which should be transmitted to the destination.

At 64, the master unit 21 sends eight clock pulses of the clock signal SCK to the serial interface 59. Responsive to the clock pulses, the destination sends the seventh command code to the serial interface 59 as an acknowledge signal in which the identification code represents the identification number of the destination. The master unit 21 checks the acknowledge signal at 65. When the acknowledge signal is not correctly received, the master unit 21 carrier out error processing at 66 in a known manner.

When the acknowledge signal is correctly received at 65, the master unit 21 sends the clock signal SCK to the serial interface 59 and a byte of the data signal as the serial data output SO at 67. The data byte is received by the destination in synchronism with the clock signal SCK. The master unit 21 checks at 68 whether or not all bytes of the data signal are already sent up to the number of bytes indicated by the addressing signal at 63. Until transmission of all bytes, steps 67 and 68 are repeated. When all bytes are already transmitted, operation of the master unit 21 proceeds to transmission termination processing at 69. In this manner, the data signal is received by the destination as received data.

During the transmission termination processing, the master unit 21 sends the fourth command code to the destination at 71 together with the identification code of the destination. In response to the fourth command code, the destination transmits parity data for the received data back to the master unit 21 at 72. The master unit 21 checks the parity data. If the check indicates that the received data are incorrect, the master unit 21 carries out error processing as at 66. When the check shows correct reception, the master unit 21 sends the tenth command code to the destination at 73. The data transmission comes to an end.

Figure 12:
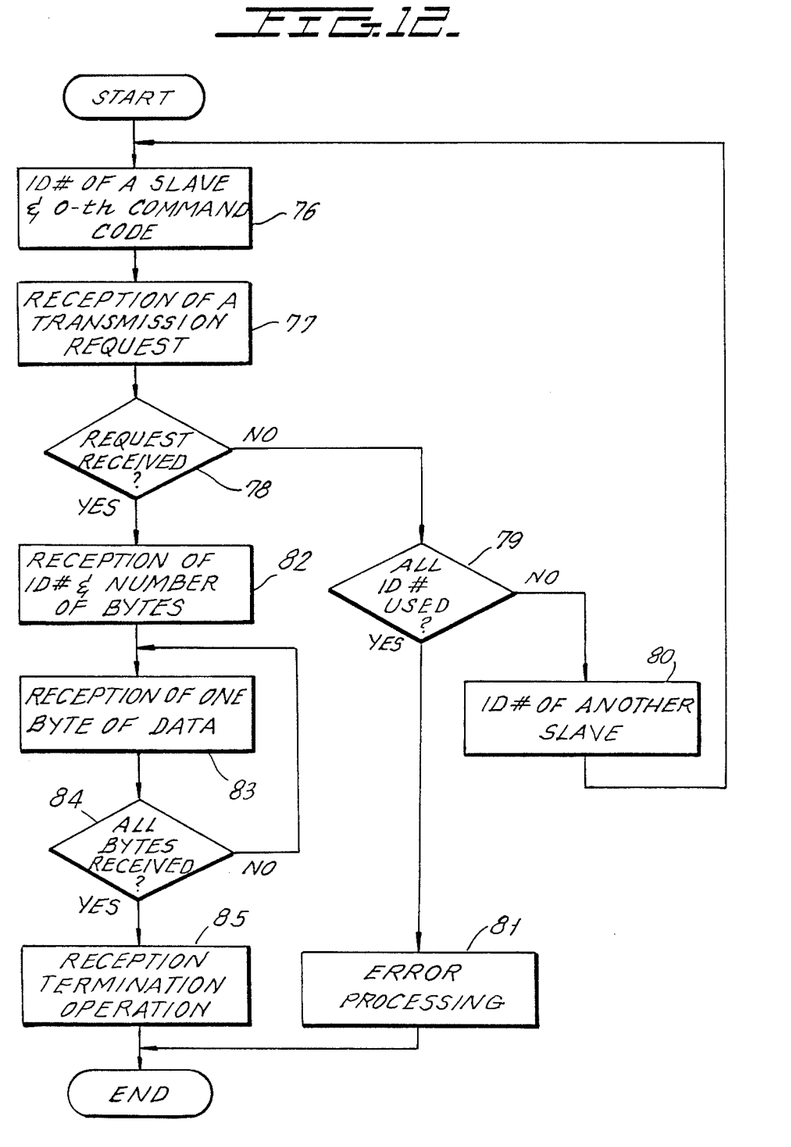
FIG. 12 is a flow chart for use in describing another operation of the serial interface system shown in FIG. 6.

Turning to FIG. 12, transmission of a data signal will be described for a case where one of the slave units 50 to 57 acts as a source or origin and transmits the data signal to the master unit 21. The identification number assigned to the source, will be called a particular identification number for convenience of description. The source is provided with data which should be transmitted as the data signal. The source is aware of the number of bytes of the data and stores the number. It will again be presumed that the data signal is transmitted by the use of various command codes defined before.

The master unit 21 (FIG. 6) transmits at 76 a polling signal to all slave units. The polling signal comprises the zeroth command code and an identification code for one of the slave units 50 to 57. At 77, the master unit 21 sends eight clock pulses of the clock signal SCK to the serial interface 59. Being identified by the identification code, one of the slave units 50 to 57 receives the zeroth command code. The slave unit checks whether or not it has data for transmission to the master unit 21. If the identification code represents the particular identification number, the slave unit is the source and sends the zeroth command code back to the master unit 21. When a plurality of slave units are simultaneously given data for transmission to the master unit 21, one such unit responds to the polling signal that is first identified by the identification code.

At 78, the master unit 21 checks whether or not the zeroth command is received as a transmission request signal together with the number of bytes from a slave unit in response to the polling signal. When no zeroth command code is received, the master unit 21 checks at 79 whether or not all identification codes are already used. If not, the master unit 21 selects another identification code at 80 to repeat steps 76 through 79. If all identification codes are already used, operation of the master unit 21 proceeds to error processing at 81. In the absence of errors, the master unit 21 is ready for other communication operations.

When the master unit 21 detects at 78 reception of the transmission request signal from the source, the master unit 21 stores the particular identification number and the number of bytes at 82. At 83, the master unit 21 sends eight clock pulses of the clock signal SCK to the serial interface 59 to make the source send one byte of the data and receives the one byte. The master unit 21 checks at 85 whether or not all bytes of the data are already received. If not, steps 83 and 84 are repeatedly carried out. Upon completion of reception of all bytes, the master unit 21 carries out reception termination operation at 85. The reception termination operation 86 is similar to the transmission termination processing 69 (FIG. 11) except that the source sends the second command code in response to the clock signal SCK sent from the master unit 21 and in compliance with the number of bytes kept in the source.

Figure 13:
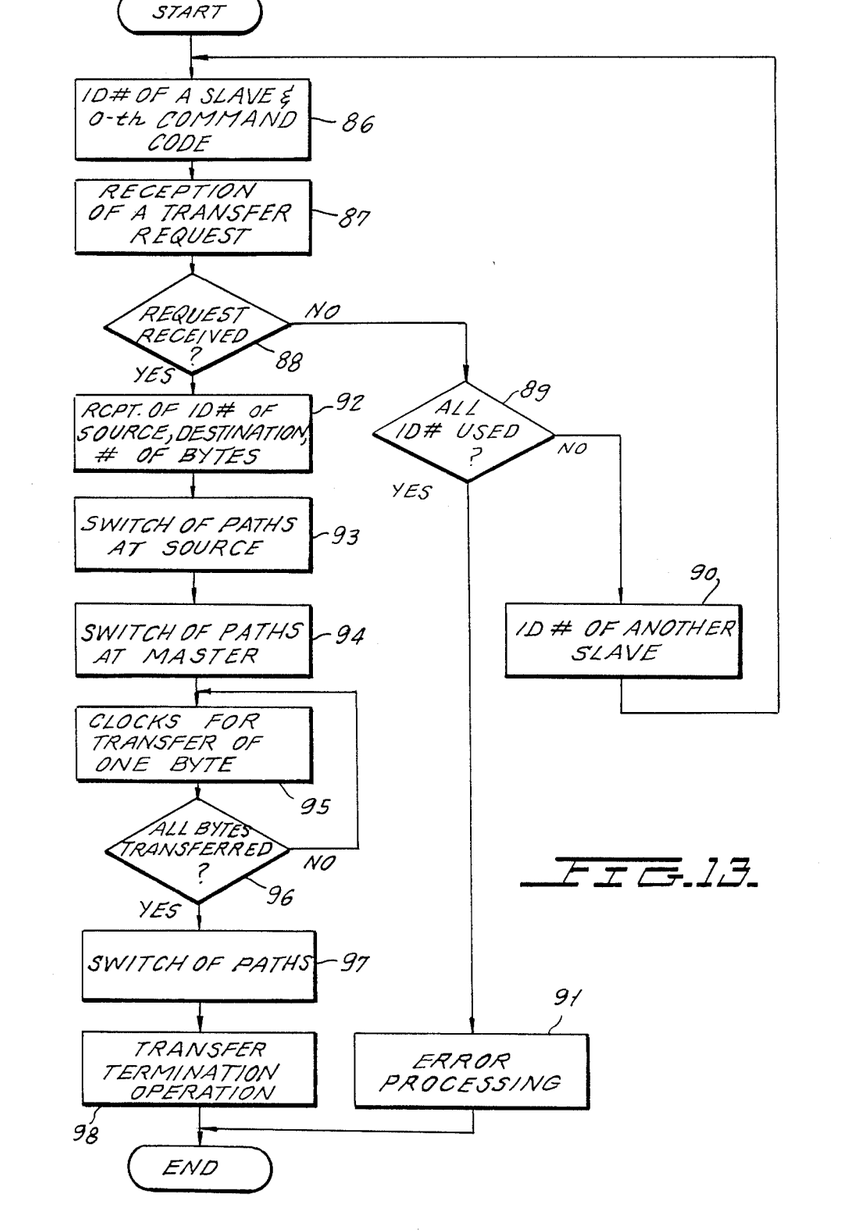
FIG. 13 is a flow chart for use in describing still another operation of the serial interface system illustrated in FIG. 6.

Referring finally to FIG. 13, description will proceed to transfer of a data signal from one of the slave units 50 to 57 used as a source to another slave unit that is used as a destination. The source is assigned with a particular identification number as above. The identification number assigned to the destination, will be called a specific identification number. Together with the number of bytes, the source is given data which should be transferred to the destination as the data signal. It is surmised that the command codes are used as before in transferring the data.

The master unit 21 (FIG. 6) sends a polling signal at 86 and eight clock pulses of the clock signal SCK at 87 to the serial interface 59, receives the zeroth command code from the source as a transfer request signal, and checks the transfer request signal at 88. Steps 86 through 88 are similar to steps 76 through 78 described in connection with FIG. 12. The master unit 21 moreover checks use of all identification codes, changes the identification code, and may carry out error processing at 89, 90, and 91 as in steps 79 through 81.

When the master unit 21 receives the transfer request signal at 88, the master unit 21 receives the specific identification number at 92. The master unit 21 switches the first and the second paths 31 and 32 (FIG. 5) from the usual state to the temporary state at 93 for the source and then at 94 for the master unit 21. As in steps 83 and 84, the master unit 21 sends eight clock pulses of the clock signal SCK to the serial interface 59 at 95 and checks at 96 whether or not the source has transferred all bytes of the data to the destination. After confirmation of transfer of all bytes, the master unit 21 switches the first and the second paths 31 and 32 back to the usual state at 97 for both the master unit 21 and the source in cooperation with the source. Transfer termination operation is carried out at 98 like the transmission termination processing or operation 69 and 85.

Reviewing FIGS. 6 through 13, it is possible to understand that the master unit 21 comprises a first arrangement which comprises as in FIG. 1 the central processor 35 and the master transmitter 36 and produces a command signal including either the ninth or the zeroth command code. The command signal is used as a first signal in activating the energizing arrangement 35-37. On the other hand, each slave unit comrises a second arrangement which comprises the slave processor 39 and the slave transmitter 41 and produces the transmission or the transfer request signal as a second signal for use in energizing the activating arrangement 35-37. Although included in fact in the slave unit, it is possible to acknowledge that the second arrangement is coupled to each slave unit. The first and second arrangements serve as the above-mentioned activating arrangement. The above-exemplified merits are achieved also by the serial interface system being illustrated.

While this invention has thus far been described in conjunction with only two preferred embodiments thereof, it will now be readily possible for one skilled in the art to carry this invention into practice in various other manners and to implement the central and the slave processors 35 and 39. Above all, the transmission from the master unit and from one or more of the slave units and/or the transfer between two or more of the slave units is possible concurrently in a time division fashion. The concurrent transmission and/or transfer is fascilitated particularly when the identification code is included in the command and the data signals for each of the slave units concerned. When the data transfer is unnecessary, the serial interface system need not comprise the path switching arrangement described with reference to FIG. 5. The master unit 21 may comprise the master transmitter and receiver 37 and 36 and the clock generator 38 in a manner which is different from that illustrated with reference to FIG. 1. Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. In a serial interface system comprising a master unit, a plurality of slave units, and a serial interface for use in slave-to-master or slave-to-slave communication, in combination with the foregoing, wherein:

said slave units are assigned respective identification numbers;

said master unit includes energizing means for transmitting or receiving through said interface data representative of the identification number of a particular one of the slave units which is to transfer information to another unit during said communication; and said system further comprises activating means for controllably activating said energizing means when said particular slave unit begins said communication, said activating means including a control path which couples said energizing means of said master unit with said plurality of slave units in parallel and which transfers an activating request generated by said particular slave unit to said master unit without prompting by prior polling of said particular slave unit by said energizing means.

2. A serial interface system as claimed in claim 1, said master unit further comprising a clock generator coupled to said interface and said energizing means, said communication being transmission of data signal of a duration from a particular slave unit of said slave units to said master unit, wherein said control path is activated by said particular slave unit, said energizing means being responsive to activation of said control path for energizing said interface with a polling signal for polling said particular slave unit by the identification number of said particular slave unit, said particular slave unit supplying said interface with an answer signal which indicates the identification number of said particular slave unit and a byte number representative of said duration, said energizing means being responsive to said answer signal for making said clock generator supply a clock signal to said interface during said duration, said particular slave unit being responsive to said clock signal for supplying said data signal to said interface in synchronism with said clock signal.

3. A serial interface system as claimed in claim 1, said master unit further comprising a clock generator coupled to said interface and said energizing means, said slave units being assigned with respective identification numbers, said communication being transfer of a data signal of a duration from a first slave unit to a second slave unit, said first and second slave units being different ones of said plurality of slave units, wherein said control path is activated by said first slave unit, said energizing means being responsive to activation of said control path for energizing said interface with a polling signal for polling said first slave unit by the identification number of said first slave unit, said first slave unit being responsive to said polling signal for supplying said interface with an answer signal which indicates the respective identification numbers of said first and said second slave units and a byte number representative of said duration, said energizing means being responsive to said answer signal for making said interface provide a temporary path between said first and second slave units during said duration, said first slave unit being responsive to said clock signal for supplying said data signal to said second slave unit through said temporary path in synchronism with said clock signal.

4. In a serial interface system comprising a master unit, a plurality of slave units, and a serial interface for use in slave-to-master or slave-to-slave communication, the improvement, in combination with the foregoing, wherein:

said slave units are assigned respective idntification numbers;

said master unit includes energizing means for receiving through said interface data representative of the identification number of a particular one of the slave units which is to transfer information to another unit during said communication;

said master unit further comprising activating means for controllably activating said energizing means when said particular slave unit begins said communication, said activating means including a control path which is shared by said energizing means and said slave units and is selectively activated when, without prompting by prior polling by said energizing means, said particular slave unit begins said communication, said control path, when activated, activating in turn said energizing means;

said master unit further comprising a clock generator coupled to said interface and said energizing means, said communication being transmission of a data signal of a duration from a particular slave unit to said master unit, wherein said control path is activated by said particular slave unit, said energizing means being responsive to activation of said control path for energizing said interface with a polling signal for polling said particular slave unit by the identification number of said particular slave unit, said particular slave unit supplying said interface with an answer signal which indicates the respective identification number of said particular slave unit and a byte number representative of said duration, said energizing means being responsive to said answer signal for making said clock generator supply a clock signal to said interface during said duration, said particular slave unit being responsive to said clock signal for supplying said data signal to said interface in synchronism with said clock signal.

5. In a serial interface system comprising a master unit, a plurality of slave units, and a serial interface for use in slave-to-master or slave-to-slave communication, the improvement, in combination with the foregoing, wherein:

said slave units are assigned respective identification numbers;

said master unit includes energizing means for receiving through said interface data representative of the identification number of a particular one of the slave units which is to transfer information to another unit during said communication;

said system further comprising activating means for controllably activating said energizing means when said particular slave unit begins said communication, said activating means including a control path which is shared by said energizing means and said slave units and is selectively activated when, without prompting by prior polling by said energizing means, said particular slave unit begins said communication, said control path, when activated, activating in turn said energizing means;

said master unit further comprising a clock generator coupled to said interface and said energizing means, said communication being transmission of a data signal of a duration from a first slave unit to a second slave unit, wherein said control path is activated by said first slave unit, said energizing means being responsive to activation by said first slave unit, said energizing means being responsive to activation of said control path for energizing said interface with a polling signal for polling said first slave unit by the identification number of said first slave unit, said first slave unit being responsive to said polling signal for supplying said interface with an answer signal which indicates the respective identification numbers of said first and second slave units and a byte number of representative of said duration, said energizing means being responsive to said answer signal for making said interface provide a temporary path between said first and second slave units during said duration and making said clock generator supply a clock signal to said first and second slave units during said duration, said first slave unit being representative to said clock signal for supplying said data signal to said second slave unit through said temporary path in synchronism with said clock signal.

6. A method of communicating data through a serial interface among a master unit and a plurality of slave units which are connected to said serial interface, said method comprising the steps of:

selectively activating a control path when a slave-to-master or a slave-to-slave communication is initiated by a slave unit without prompting by prior polling by said master unit, said control path being connected to said master and said slave unit; and responsive to activation of said control path, polling by said master unit of said slave units to locate a particular slave unit initiating communication, and then transmitting by said particular slave unit to said master unit through said interface first data identifying said particular slave unit involved in said communication.

7. A method as claimed in claim 6, further comprising the step of:

successive to said first data, transmitting from or to said master unit through said interface second data representative of the number of bytes to be transmitted to or from said particular slave unit.

8. A method as claimed in claim 6, further comprising the steps of:

transmitting clock pulses during said communication from said master unit to said slave units through said interface; and transmitting through said interface data to or from said particular slave unit in synchronism with said clock pulses.

9. A serial interface system comprising a master unit, a plurality of slave units, a serial interface including a first path and a second path, and a control path, said plurality of slave units being coupled to master unit in parallel through said serial interface and said control path, wherein:

said master unit includes a control processor, a master transmitter and a master receiver, said master transmitter being connected to said second path, said master receiver being connected to said first path and to said control path;

each slave units includes a slave processor, a slave transmitter and a slave receiver, said slave transmitter being connected to said first path and said control path, said slave receiver being connected to said second path;

one slave unit includes means to transmit an activating request to said master unit through said control path without prompting by prior polling of said one slave unit by said master unit;

said master unit including means to transmit a polling signal into said second path in response to said activating request transmitted from said one slave unit; and said one slave unit including means to transmit an answer signal to said master unit through said first path in response to said polling signal transmitted from said master unit.

10. A serial interface system as claimed in claim 9, wherein:

said plurality of slave units are assigned respective identification numbers; and said polling signal contains information representative of the identification number.

11. A serial interface system as claimed in claim 9, wherein:

said answer signal transmitted from said one slave unit to said master unit contains information representative of the identification number.

12. A serial interface system as claimed in claim 11, wherein:

said answer signal further contains information representative of byte number of data.

13. A serial interface system as claimed in claim 9, wherein:
said master unit further includes a clock generator:
said serial interface further includes a clock path receiving a clock signal from said clock generator;
said slave receiver of said each slave unit is connected to said clock path;
said master unit includes means to transmit said polling signal in synchronism with said clock signal; and
said one slave unit includes means to transmit said answer signal in synchronism with said clock signal.

14. A serial interface system as claimed in claim 13, wherein:
said clock generator includes means to generate said clock signal after said master receiver of said master unit receives said activating request from said one slave unit.

15. A serial interface system comprising a master unit, a plurality of slave units, a serial interface including a first path and a second path, and a control path, said plurality of slave units being coupled to said master unit in parallel through said serial interface and said control path, wherein:
said master unit includes a control processor, a master transmitter, a master receiver and a master switcher, said master transmitter being connected to said second path through said master switcher, said master receiver being connected to said first path through said master switcher and to said control path, said master switcher being capable of reversely connecting said first path to said master transmitter and of reversely connecting said second path to said master receiver;
each slave unit includes a slave processor, a slave transmitter, a slave receiver and a slave switcher, and slave transmitter being connected to said first path through said slave switcher and to said control path, said slave receiver being connected to said second path through said slave switcher, said slave switcher being capable of reversely connecting said first path to said slave receiver and of reversely connecting said second path to said slave transmitter;
one slave unit includes means to transmit an activating request to said master unit through said control path, without prompting by prior polling by said master unit;
said master unit includes means to transmit a polling signal into said second path in response to said one slave unit and another slave unit, and said master unit temporally controls said master switcher of said master unit and the slave switcher of said another slave unit for the reverse connection; and
said one slave unit includes means to transmit a data signal to said another slave unit through said first path in reponse to said polling signal transmitted from said master unit.

16. A serial interface system as claimed in claim 15, wherein:
said plurality of slave units are assigned respective identification numbers; and
said polling signal contains information representative of the identification number.

17. A serial interface system as claimed in claim 15, wherein:
said master unit further includes a clock generator:
said serial interface further includes a clock path receiving a clock signal from said clock generator;
said slave receiver of each slave unit is connected to said clock path;
said master unit includes means to transmit said polling signal in synchronism with said clock signal; and
said one slave unit includes means to transmit said data signal in synchronism with a clock signal.

18. A serial interface system as claimed in claim 17, wherein:
said clock generator includes means to generate said clock signal after said master receiver of said master unit receives said activating request from said one slave unit.

* * * * *